United States Patent [19]

Tabor

[11] Patent Number: 5,368,259
[45] Date of Patent: Nov. 29, 1994

[54] DUAL LEADING EDGE RAM AIR AIR FOIL

[76] Inventor: Dorald C. Tabor, 4540 Cape May Ave., San Diego, Calif. 92107

[21] Appl. No.: 146,449

[22] Filed: Oct. 29, 1993

[51] Int. Cl.⁵ .................. B64D 17/02; B64D 17/18; B64D 17/34
[52] U.S. Cl. .................. 244/145; 244/152; 244/153 R; 244/902
[58] Field of Search ........... 244/142, 145, 152, 153 R, 244/155 R, 900, 902

[56] References Cited

U.S. PATENT DOCUMENTS

| | | | |
|---|---|---|---|
| 3,285,546 | 11/1966 | Jalbert | 244/902 |
| 4,406,433 | 9/1983 | Radkey et al. | 244/902 |
| 4,771,970 | 9/1988 | Sutton | 244/145 |
| 4,860,970 | 8/1989 | Roselli | 244/900 |
| 4,930,726 | 6/1990 | Jalbert | 244/900 |
| 5,012,993 | 5/1991 | Schaforth | 244/145 |
| 5,169,092 | 12/1992 | Murakami | 244/145 |
| 5,180,123 | 1/1993 | Lin | 244/155 A |

FOREIGN PATENT DOCUMENTS

| | | | |
|---|---|---|---|
| 2268687 | 4/1974 | France | 244/145 |
| 2633248 | 12/1989 | France | 244/145 |
| 3500120 | 7/1986 | Germany | 244/900 |

*Primary Examiner*—David A. Bucci
*Assistant Examiner*—Virna Lissi Ansley
*Attorney, Agent, or Firm*—John R. Ross

[57] ABSTRACT

A ram air wind power device. Parallel chambers of a sail fabricated from flexible material provide structure to the sail when filled with ram air. The chambers have openings at each end and each opening contains a valve. The openings to the parallel chambers provide two leading-trailing edges of the sail. One of the leading-trailing edges will function as a leading edge if the openings on that edge is facing into the wind, in which case the valves of the chambers at that edge will be open and the valves in the chambers at the other edge will be closed. When the other leading-trailing edge faces into the wind that edge becomes the leading edge. Preferred embodiments include kites, parachutes and gliders.

10 Claims, 11 Drawing Sheets

Fig. 1
Fig. 2
Fig. 3
Fig. 4
Fig. 5
Fig. 6
Fig. 7
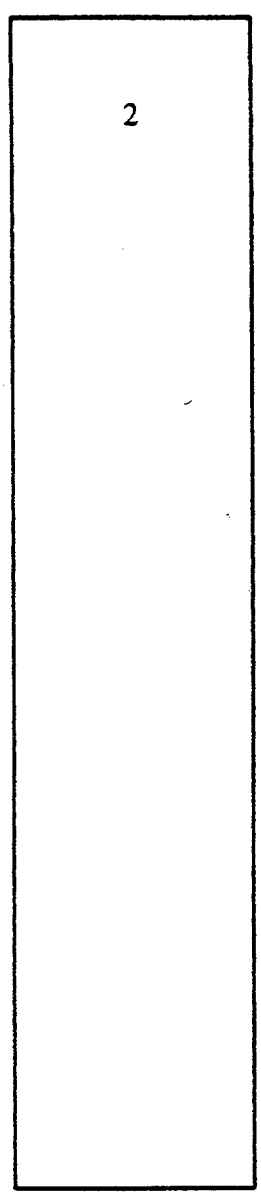
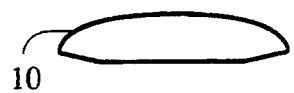
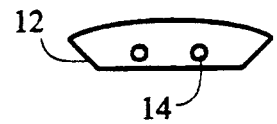

Fig. 8
Fig. 9
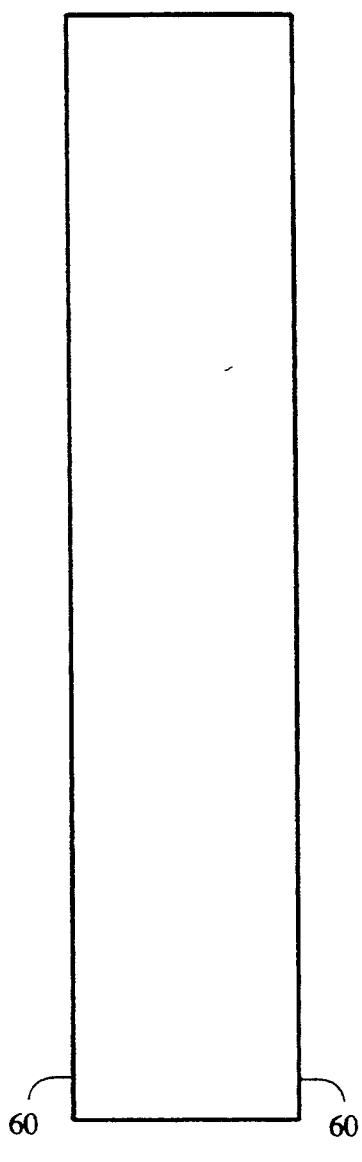
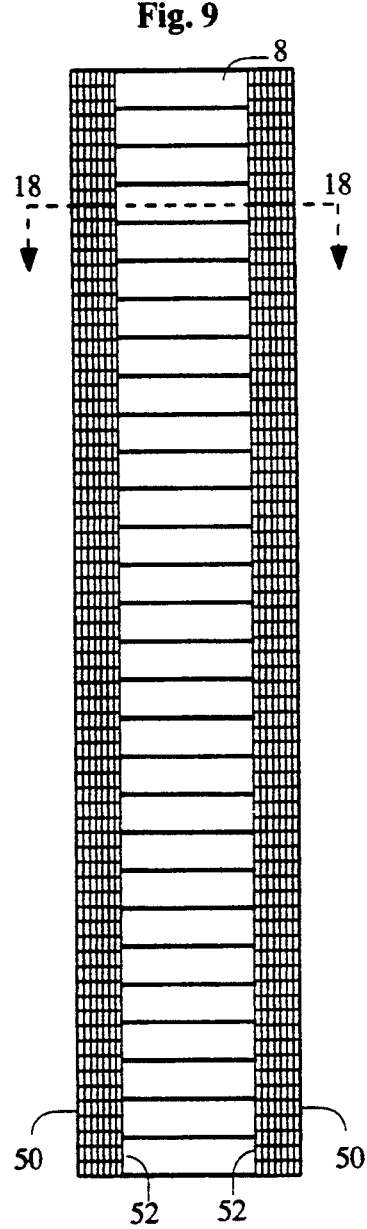
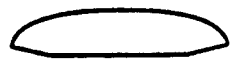
Fig. 10

19  21

32

32

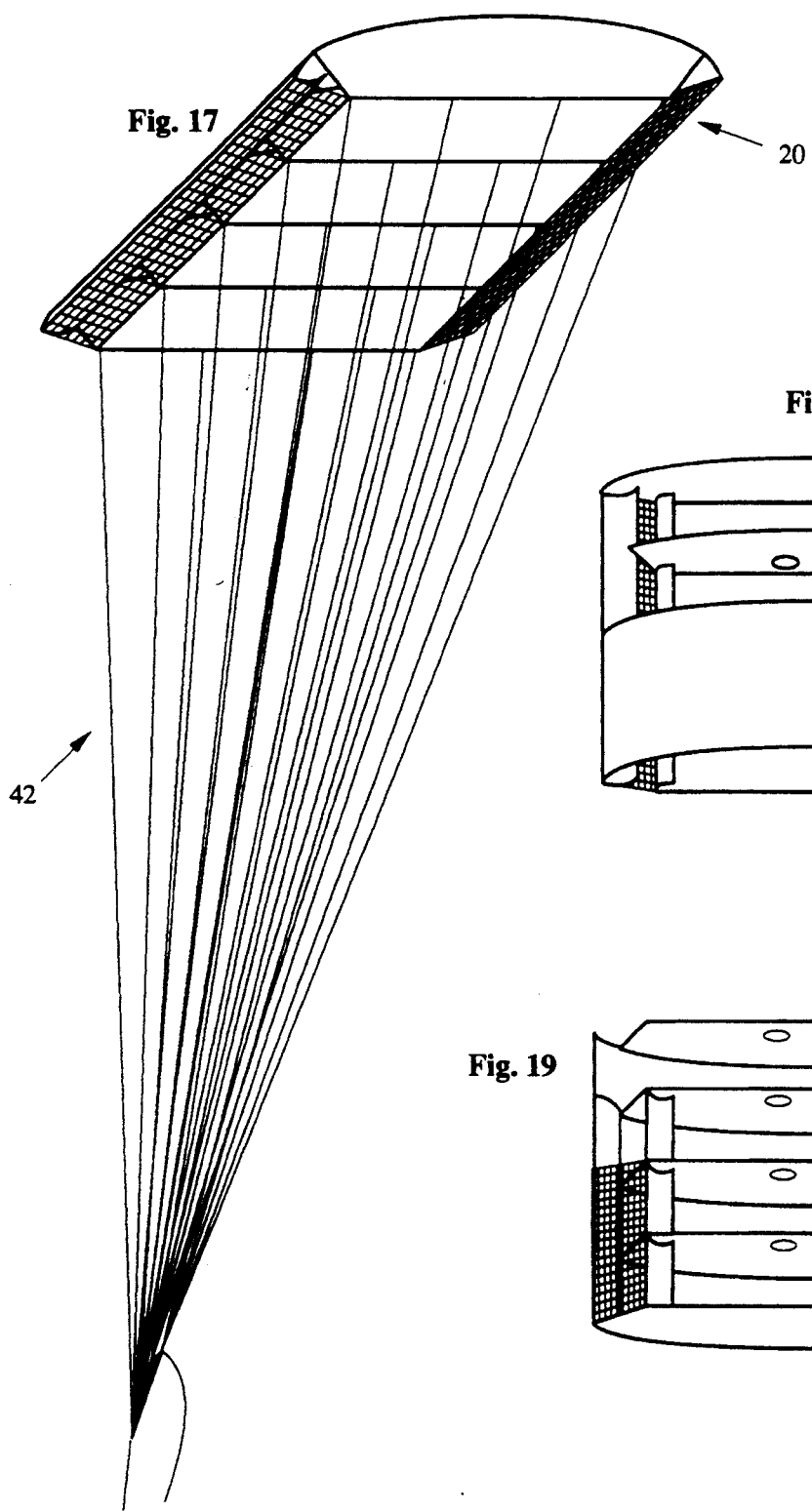

DUAL LEADING EDGE RAM AIR AIR FOIL

BACKGROUND OF THE INVENTION

A great many types of kites are commercially available. Most kites are made with a material such as paper, nylon cloth or sheet plastic stretched over a frame made of a framing rods often called spars. Some kites now in use do not have rod frames, but their structure is provided by air pressure provided by the same wind which is causing the kite to fly. These types of kites are called ram air kites. One of these prior art kites is pictured in FIG. 31. This kites contains 5 air chambers which when filled with air under pressure give structure to the kite. The kite is flown with a leading edge 80 facing into the wind. Air provided by the wind is forced into chambers 81 through opening 82 in the leading edge 80. The ram air design captures the wind, creating an overpressure sufficient to inflate the kite and maintain its shape throughout its wind window.

These ram air kites can be made very large. Some are commercially available with a windward surface area of about 250 square feet. It has become popular to use these ram air kites to provide the force necessary to propel small vehicles such as small carts, small boats, small water boards, bicycles, tricycles, snow boards and skate boards. A sport of kite racing is developing in the United States and several other countries. When using a kite to propel a vehicle, control of the position and direction of the kite is very important. Ram air kites of the type shown in FIG. 31 move well in the direction of its leading edge. However, it can move in the direction of its trailing edge only very slowly. Any attempt to move the kite quickly in the direction of its trailing edge will reduce the ram air pressure and cause the kite to deflate and/or collapse. Normally, the pilot desiring to move the kite in the direction of its trailing edge will cause the kite to slowly turn 180 degrees so that its leading edge is facing in the direction that was its trailing edge. This maneuver is difficult to perform at angles of more than 70 degrees off the wind direction; therefore, a slow backup of the kite is often required in order to have the kite flying at angles less than 70 degrees of the wind direction. Having to slow down or back up a kite is often very undesirable, especially to the competitive kite pilot.

The concept of using ram air to provide the structure to a kite has also been applied to parachutes and to gliders. As with the prior art kite, these prior art parachutes and gliders provide only one leading edge so that the parachute and the glider must go in the direction of that leading edge or the structure could be destroyed.

It is the object of the present invention to provide a ram air kite more maneuverable than prior art ram air kites.

SUMMARY OF THE INVENTION

The present invention provides a ram air wind power device. Parallel chambers of a sail fabricated from flexible material provide structure to the sail when filled with ram air. The chambers have openings at each end and each opening contains a valve. The openings of the parallel chambers provide two leading-trailing edges of the sail. One of the leading-trailing edges will function as a leading edge if the openings on that edge is facing into the wind, in which case the valves of the chambers at that edge will be open and the valves in the chambers at the other edge will be closed. When the other leading-trailing edge faces into the wind that edge becomes the leading edge. Preferred embodiments include kites, parachutes and gliders.

BRIEF DESCRIPTION OF THE DRAWINGS

FIGS. 1, 2, 3, 4, 5, 6 and 7, are drawings of parts a kite used to fabricate a preferred embodiment of the present invention.

FIGS. 8, 9 and 10 show views of a preferred embodiment.

FIGS. 17, 18 and 19 show views of four cells (or chambers) of this embodiment.

FIG. 28 is a drawing of an embodiment of the present invention used as a parachute.

DETAILED DESCRIPTION OF PREFERRED EMBODIMENTS

Dual Leading Edge Ram Air Kite

Figure 11:
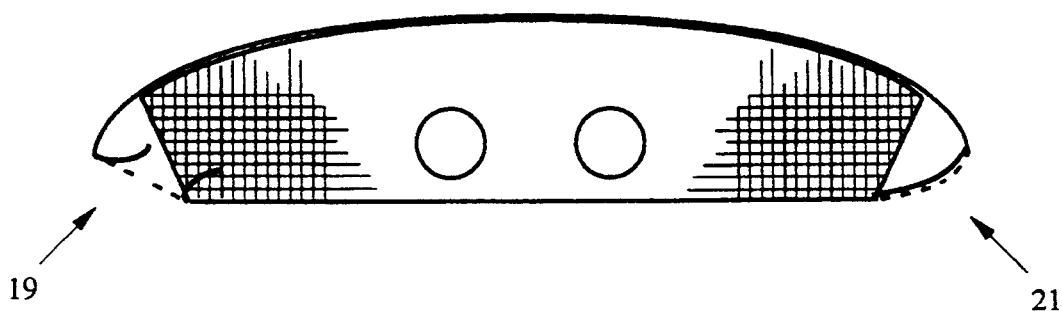
FIGS. 11, 12, 13, 14, 15, 16, show details explaining how the kite is sewn together.

A preferred embodiment of a dual leading edge kite may be fabricated and flown as described below by reference to FIGS. 1 through 27.

Patterns for cutting the material for this kite are shown in FIGS. 1 through 7. The parts are top sheet 2, two leading edge nettings 4, two top valve sheets for vents 6, 58 bottom valve sheets for vents 8, two end rib sheets 10, 28 interior rib sheets 12 containing holes 14, and 29 bottom sheets 16. In this preferred embodiment the long dimension of these parts is 30 feet. The short dimension of the top sheet 2 is 6 feet. The short dimension of parts 4 and 6 is 10 inches and 5 inches respectively. The dimension of part 8 is 5 inches by 1 foot, and the bottom length of the ribs 10 and 14 is 4½ feet. The shape of the ribs are as shown with the maximum height being 14 inches. The dimension of part 16 are 4½ feet by 14 inches.

Parts 2, 6, 8, 10, 12 and 16 are preferably cut from ¾ ounce rip stop nylon kite cloth. Part 4 is cut from polyester mesh cloth made with knitted polyester thread with ⅛ inch square spacings.

Figure 15:
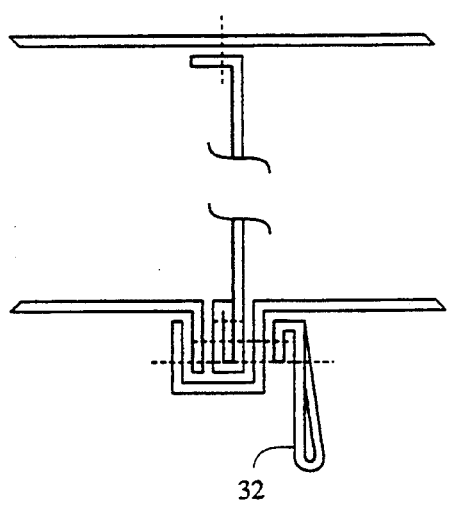
Figure 16:
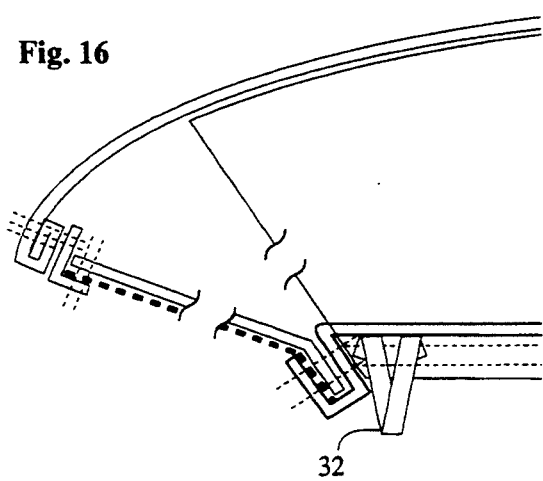

The parts are sewed together as shown in FIGS. 8, 9, 10, 14, 15 and 16. In general as shown in FIGS. 8 and 9, edges 50 of netting 4 is sewed to edges 60 of top sheet 2; edges 52 of netting 4 is sown to the short edges of the 29 bottom sheets 8. Ribs 10 and 12 are sown to bottom sheets 8 and top sheet 2 to complete 29 chambers in the kite as shown in FIGS. 15 and 16. One long edge of each of top valves 6 is sown to edges 50 of netting 4 and one long edge of each of the 58 bottom valves 8 is sown to edges 52 and 54 of netting 4. Preferred methods of making strong seams will be apparent to persons skilled in the art of kite by making reference to FIGS. 14, 15 and 16. In this embodiment, 120 shroud connecting loops 32 are sown to the kite at locations along the bottom side of the kite as shown in FIGS. 14, 15, 16 and 17. FIG. 17 shows only a four panel section of the kite with 20 shroud lines 42. The full kite has 29 chambers with 120 shroud lines. The 60 leading edge shroud lines 42A shown in FIG. 27 all have lengths of 20 feet. The 60 interior shroud lines 42B all have lengths of 19.5 feet.

Figure 20:
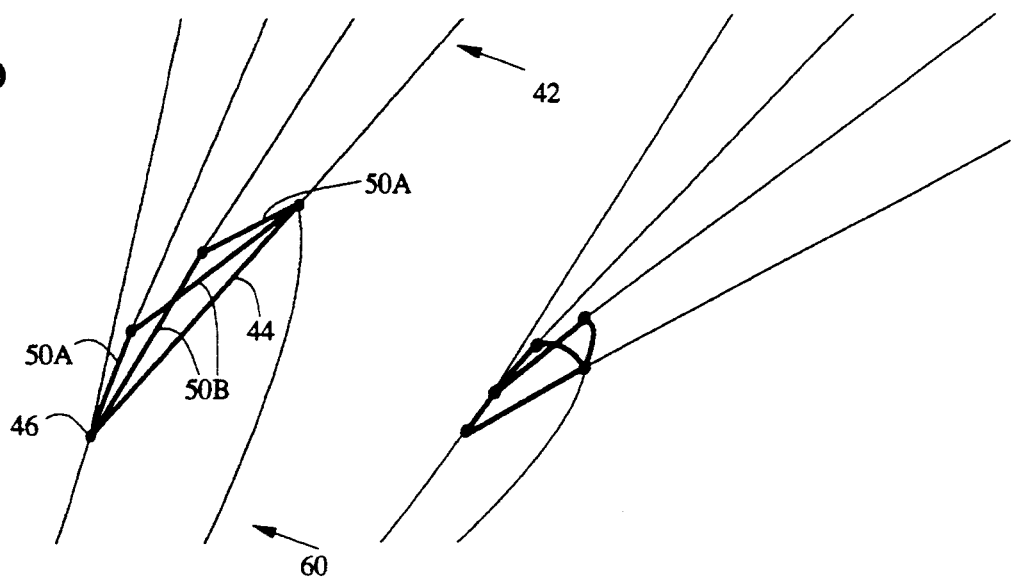
FIGS. 20, 21, and 22 show views of the harness of the above embodiment.
Figure 21:
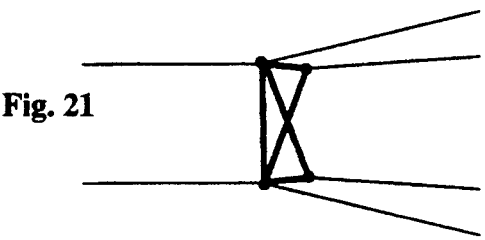
Figure 22:
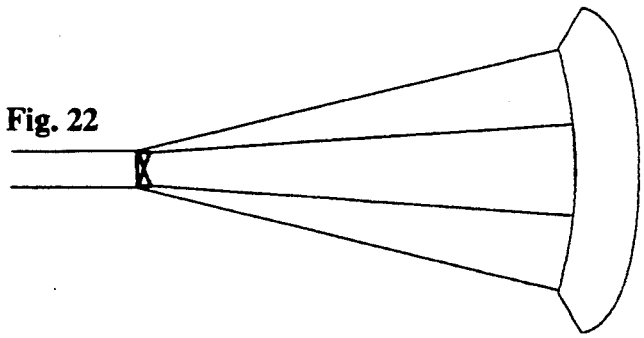
Figure 23:
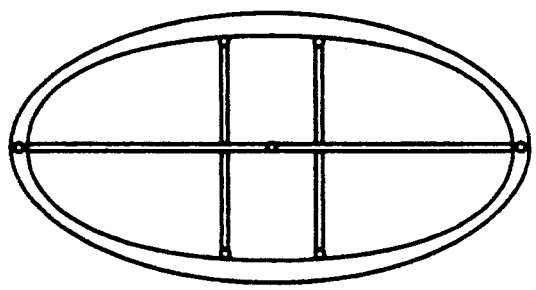
FIGS. 23, 24 and 25 show views of the steering wheel of the above embodiment.
Figure 24:
Figure 25:
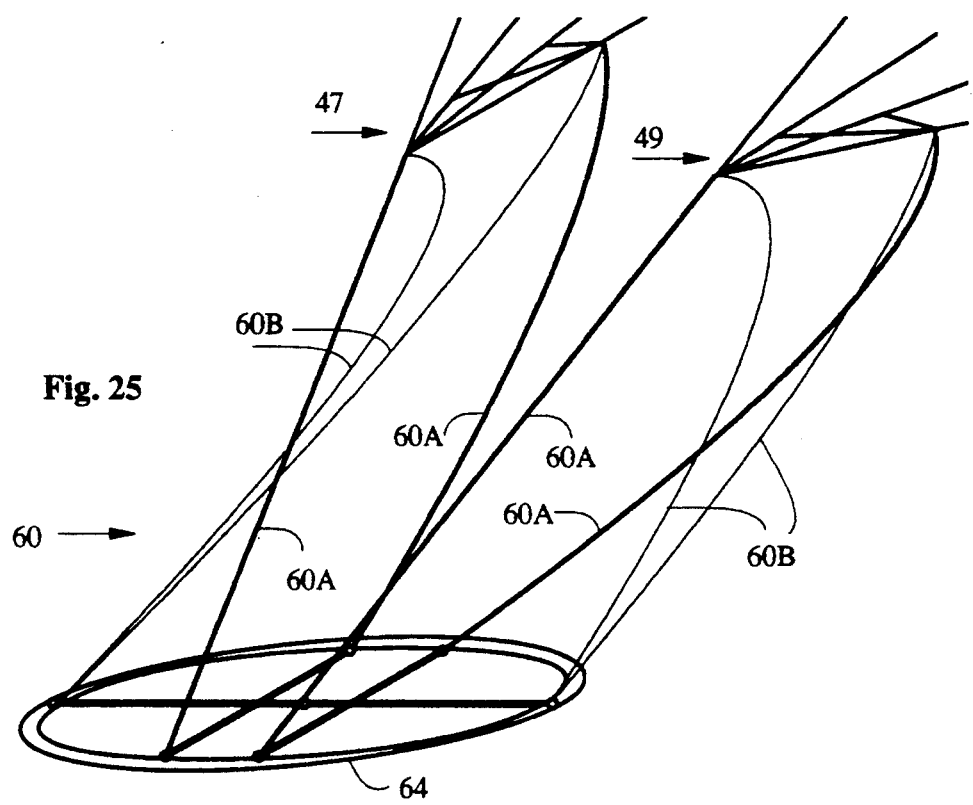
Figure 26:
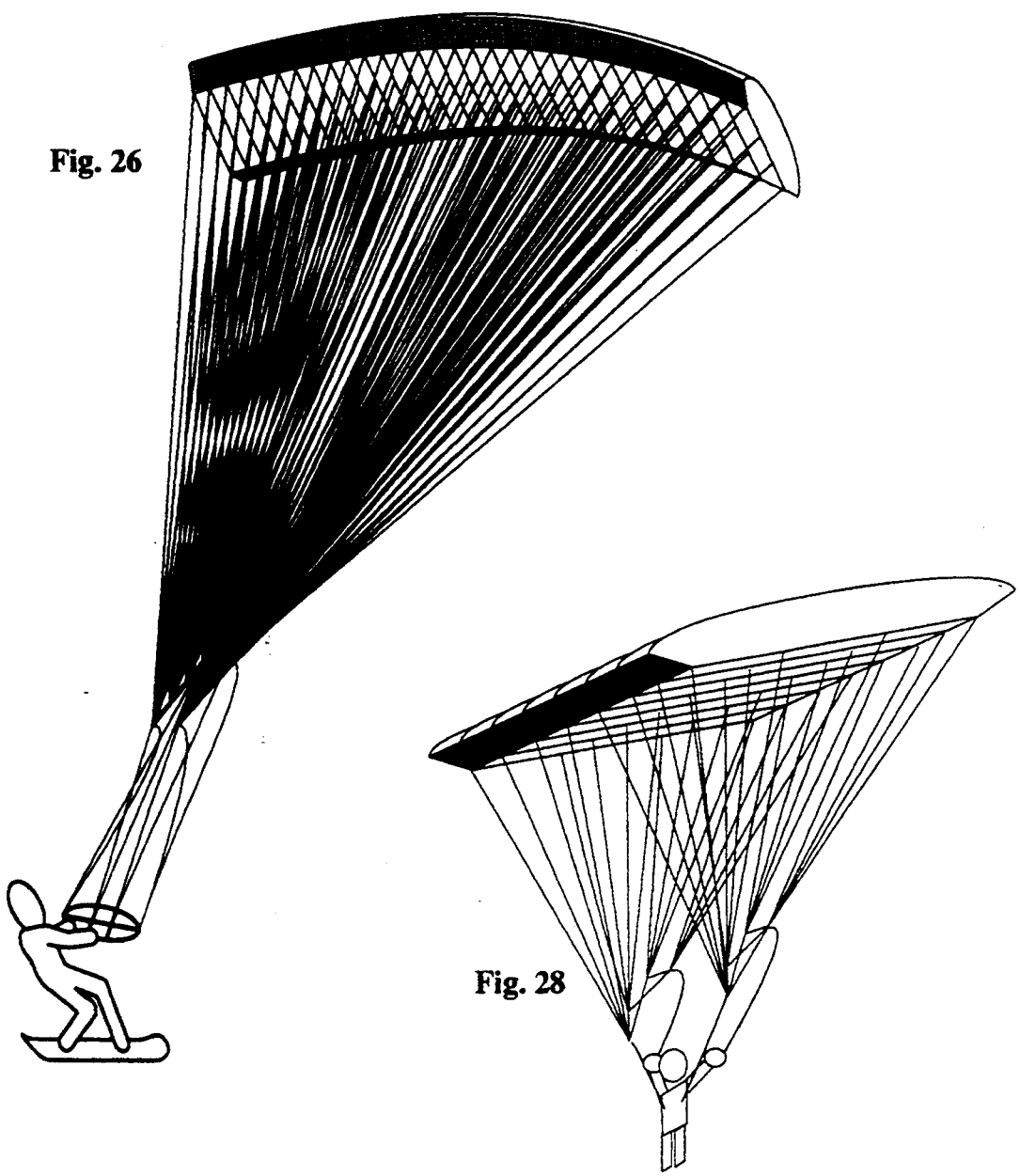
FIG. 26 shows the above embodiment being used to pull a pilot on a snowboard.
Figure 27:
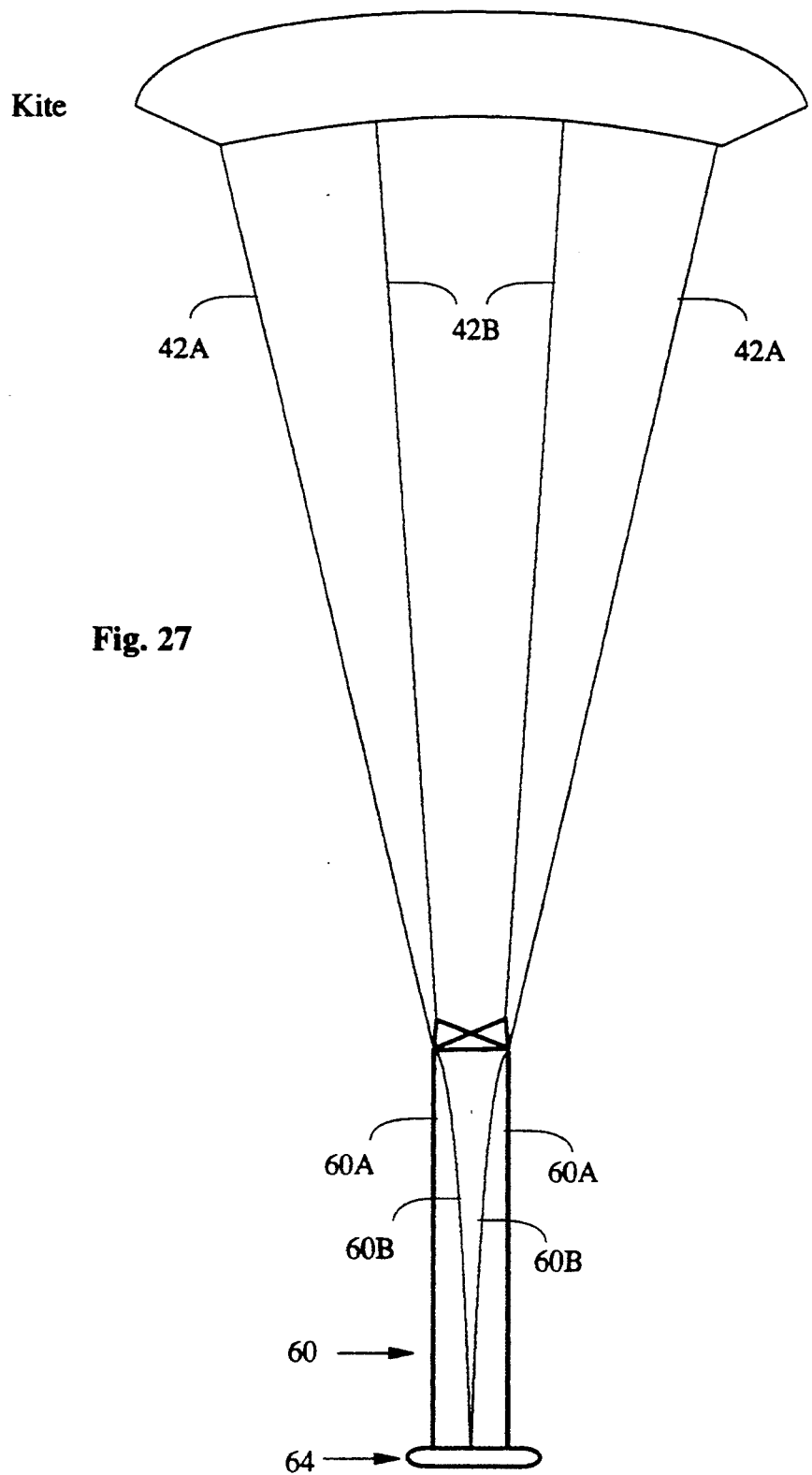
FIG. 27 shows a side view of the above preferred embodiment.

As shown in FIG. 17, two leading edge shroud and two interior shroud lines make up a set of shroud lines and there are 30 sets (5 of which are shown in FIG. 17) attached along the panel seams. The harness is made up of two harness sets 47 and 49 as shown in FIGS. 25. A total of 15 sets of shrouds are attached to one harness set and 15 to the other harness set. The two harness sets are just alike and each are made of 4 knots 46 connecting 5 cords: two 50A, two 50B, and one cord 44 which I call the bridle, all as shown in FIG. 20. The dimensions of the harness cords are set forth in Table 2.

TABLE 2

| Harness Cord | Length |
| --- | --- |
| 50A | 7 inches |
| 50B | 11 inches |
| 44 Bridal | 11 inches |

The control lines 60 in this embodiment is made of eight cords, four elevation cords 60A and four transverse cords 60B as shown in FIG. 25. Cords 60A are 30 feet long and cords 60B are 30 feet 6 inches long.

All cords for the shrouds are standard 100 pound Dacron kite line. The harness cords are 500 pound kite line and the harness cords 60A are 1000 pound kite line and cords 60B are 300 pound kite line.

The harness is attached to steering wheel 64 as shown in FIG. 25. Steering wheel is oval shaped with a major dimension of 2½ feet and a minor dimension of 1 feet and is made of plastic tubing.

Flying the Kite

Figure 12:
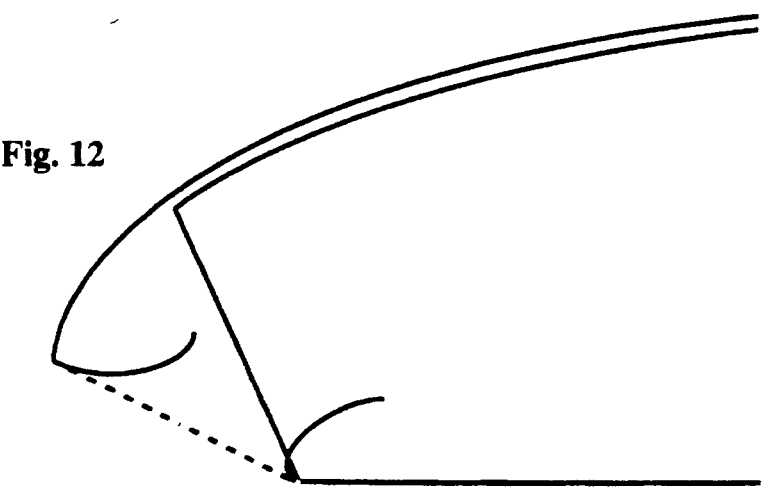
Figure 13:
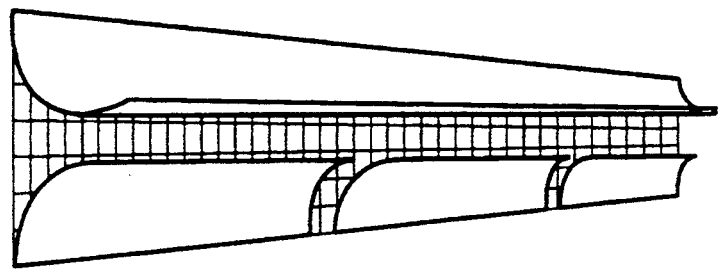
Figure 14:
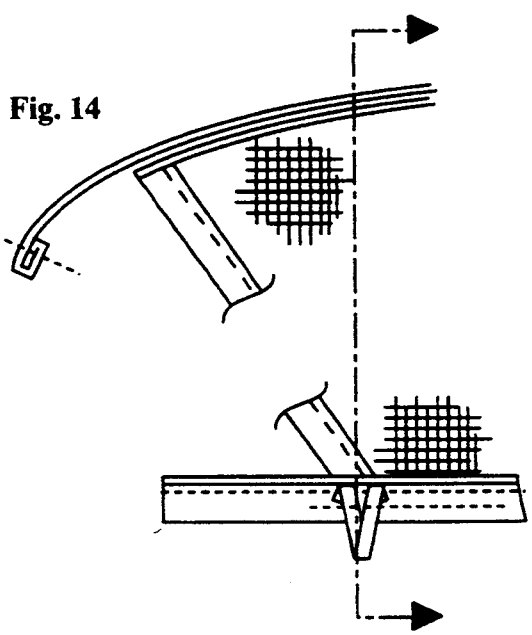

When flying, either of the long sides of the kite can be its leading edge. Whichever edge is the leading edge, its valves will open as shown in at 19 in FIG. 11 and the other edge will be the trailing edge with the valves on that edge closed as shown at 21 in FIG. 11. With careful adjustment of the steering wheel both edges can become leading edges and the kite flies perfectly well. Other views of the valves operations are shown in FIGS. 12 and 13.

The kite flies relative to the to the steering wheel. Some control motions produce relatively instantaneous reactions from the kite. Other control motions are more subtle in their response from the wing. For a slow turn, gently turn the wheel clockwise. The kite will slowly turn clockwise. Do likewise for counter clockwise. This turn is caused by induced kite curvature from the twisted lines. For faster turns stall one half of the kite and while also adding aileron control. When you pull the right end of the wheel closer to your body, relative to the left end of the wheel. The right side of the kite is caused to stall and an aileron on the right trailing edge will cause a right turn. A left turn is caused with a pull on the left side of the wheel. When the ends of the wheel are of equal distance from your body the kite will fly in a straight line. You can also use these two steering actions in opposition. A balanced amount of turning left and pulling right is used to hold the kite in the upper left hand corner of your flying area. This is used when flying into the wind.

When you change the angle of attack of the steering wheel, you change the angle of attack of the kite and speed and the direction in which it flies. If the angle of attack of the wheel is slowly changed, the kite will become concave. This is desirable closer to the ground for adding drag and power. If the angle of attack of the wheel is changed quickly, the kite's angle of attack response is just as quick and the kite will fly in the opposite direction under full power and speed. By pulling and pushing the top and bottom of the wheel quickly you can cause the kite to bounce left and right or up and down, depending on the vertical or horizontal orientation of the kite.

The change of one leading edge to the other can be accomplished slowly or very quickly and the change can take place no matter at what angle the kite is flying with respect to the direction of the wind. No backing down of the kite is required.

Improvements Over Prior Art The present invention offers many advantages over prior art ram air kites. These advantages include the following:

1) Either or both edges can be used for inflation. Initial inflation is made easier. Also when the kite is parked on the ground the leading edge is always on top ready for instant full power take off.

2) The foil will not collapse during sudden hard stops. Panic stops can collapse prior art ram air kites when the trailing edge is pulled too far too fast. This can cause the kite to lose directional control. The kite of the present invention can bounce from one edge to the other as fast as the handle can be moved with no loss of inflation. This gives the pilot the ability to change directions immediately at any time.

3) Better performance at high angle of attract.

4) When kite is down wind sail curvature will provide added power as compared to the same size prior art kites.

Pulling a Cart

Here are directions for using the above described kite for pulling a cart downwind:

While sitting in the cart use the handle to steer the kite into the power of the wind (i.e., 40 degrees to the left or right of the center of the wind direction). Most of the time the pilot will be steering the cart in the same direction that the kite is flying. The pilot can change down wind directions as described above.

Here are directions for going into the wind:

Steer the kite to the edge of the wind (70 plus degrees to the left or the right of the center of the wind direction). Steer the cart in the same direction as the kite is traveling. But angle the cart modestly into the wind. The cart in now traveling slightly into the wind. To change direction and still be going into the wind perform a leading edge change to change the kites direction. Then steer the cart down wind and back into the wind. This is the same strategy used by the square rigged ships of the the through the centuries. FIGS. 30 A, B, C, D, E and F show how this is done. The cart is 80, the kite is 81, the arrow at the tops of the figures indicate the direction of the wind and the arrow on the front to the cart indicates the direction of the cart and the dashed lines show where the cart has been.

Winning Races

One major advantage of a kite of the present invention over prior art ram air kites is that on down wind laps, the kite can be kept in the "power of the wind"

(i,e., 40 degrees off the wind) continuously by bouncing the kite from one leading edge to the other. The other major advantage is that the my kite can be made to change directions quickly when at the "edge of the wind"; whereas with the prior art ram air kites, direction changes from the edge of the wind must be made slowly.

Dual Leading Edge RAM Air Parachute and Glider

Figure 31:
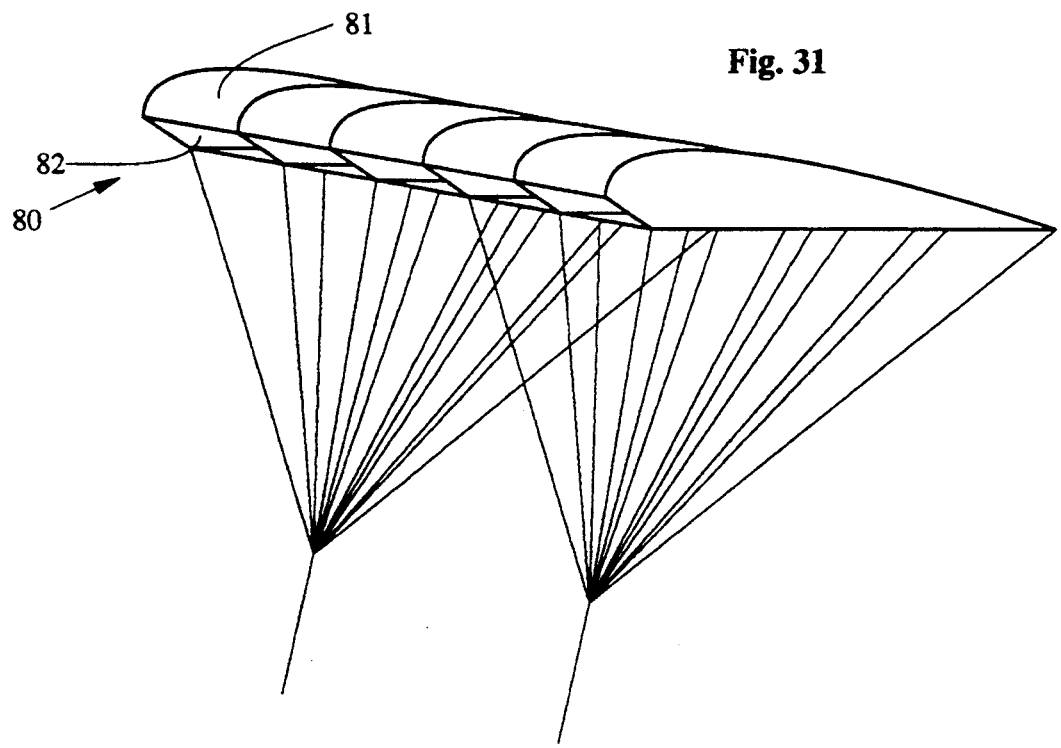
FIG. 31 is a prior art kite.
Figure 29:
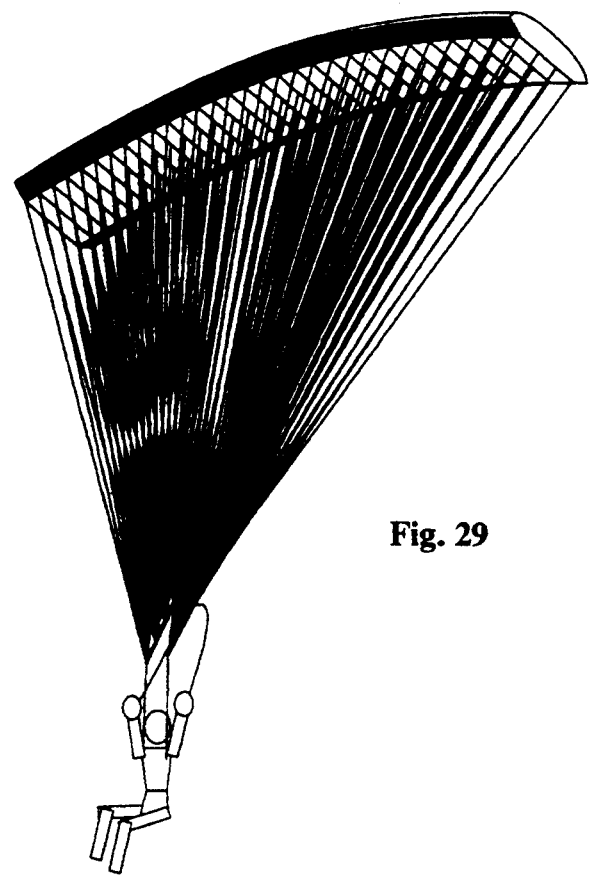
FIG. 29 is a drawing of an embodiment of the present invention used as a glider.
Figure 30A:
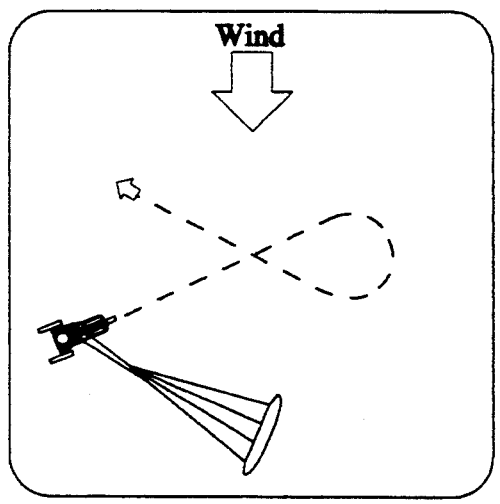
FIGS. 30A-30F show how to pilot a cart with a kite.
Figure 30B:
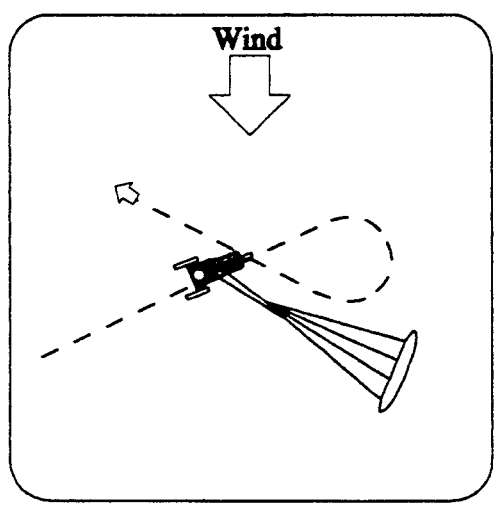
Figure 30C:
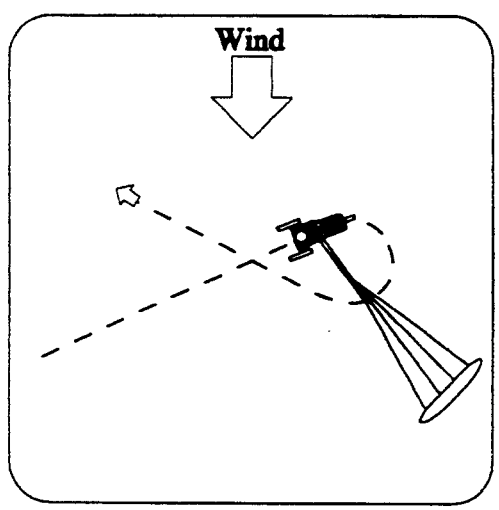
Figure 30D:
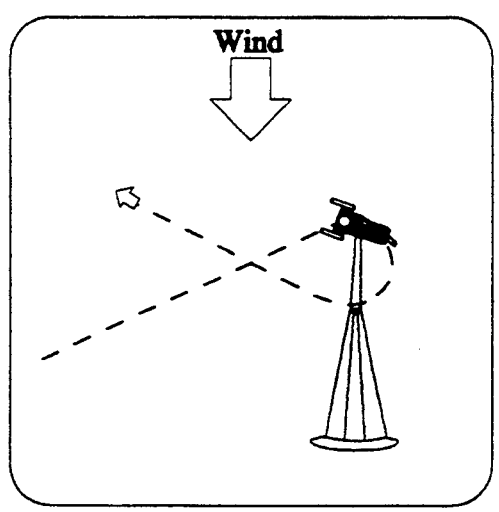
Figure 30E:
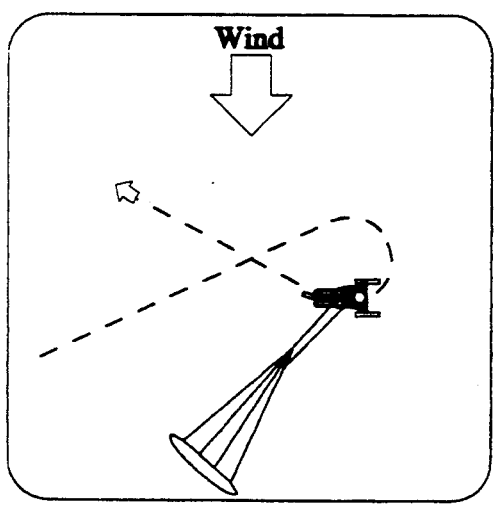
Figure 30F:
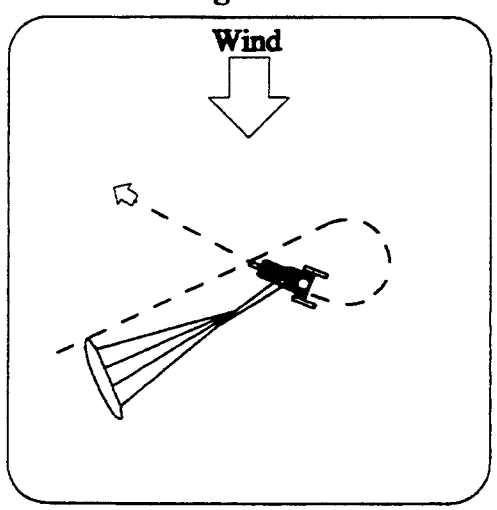

The present invention also covers parachutes and gliders. A preferred embodiment of a parachute constructed in accordance with the present invention is shown in FIG. 31 and a glider is shown in FIG. 30. These embodiments would be exactly like the kite described above except the parachute would preferably have a shape closer to a square. Also, on both the parachute and the glider, one of the leading edges would be the main direction of flight and the harness of this edge would be connected to a body harness. The other edge would be connected to steering rings and would be used to steer the glider or parachute and reverse direction.

While the above description contains many specificities, the reader should not construe these as limitations on the scope of the invention, but merely as exemplifications of preferred embodiments thereof. Those skilled in the art will envision many other possible variations are within its scope. For example, the kite can be made in many different sizes for various pulling forces and wind conditions. Many different materials could be used other than the ones specified and there are a variety of sewing methods known to those skilled in the art other than the methods disclosed above. Accordingly the reader is requested to determine the scope of the invention by the appended claims and not by the examples which have been given.

I claim:
1. A ram air type wind power device comprising:
   A) a sail comprised of flexible material fabricated into a plurality of chamber means aligned generally parallel to each other and side-by-side for providing structure to the sail when filled with air under under pressure:
      1) each of said chamber means defining two ends, defining a first end and a second end, and having an opening at each end and a passageway for air between the two openings
      2) said first end of each of said plurality of chambers being aligned to define a first leading-trailing edge of said sail and said second end of said plurality of chambers being aligned to define a second leading-trailing edge of said sail,
      3) each of said chamber means comprising a first valve means located within a few inches of said first leading-trailing edge for allowing air into said chamber means when said first leading-trailing edge is functioning as a leading edge and for trapping air in said chamber when said first leading trailing edge is functioning as a trailing edge and a second valve means located within a few inches of said second leading-trailing edge for allowing air into said chamber means when said second leading-trailing edge is functioning as a leading edge and for trapping air in said chamber when said second leading trailing edge is functioning as a trailing edge,
   B) a plurality of shroud lines attached to said sail,
   C) a harness attached to said shroud lines, and
   D) a sail control means for controlling the position of said sail.

2. A wind power device as in claim 1 wherein said device is a ram air kite and said control means comprises a set of control lines attached to said harness.

3. A wind power device as in claim 2 wherein said control means comprises a steering wheel.

4. A wind power device as in claim 1 wherein said first and second valve means comprise flaps of flexible material and screen cloth.

5. A wind power device as in claim 1 wherein said device is a ram air parachute and said harness comprises a cargo attachment means for attaching a person or cargo to said parachute.

6. A wind power device as in claim 1 wherein said device is a ram air glider and said harness comprises a cargo attachment means for attaching a person to said glider.

7. A wind power device as in claim 2 and further comprising a vehicle means to transport a passenger with a transporting force being applied by wind blowing on said wind power device.

8. A wind power device as in claim 7 wherein said vehicle means is a cart.

9. A wind power device as in claim 7 wherein said vehicle means is ice sled.

10. A wind power device as in claim 7 wherein said vehicle means is boat.

* * * * *